United States Patent [19]

Lo

[11] 4,294,787
[45] Oct. 13, 1981

[54] METHOD OF PRODUCING REINFORCED COMPOSITE RACKET FRAME

[76] Inventor: Kun-Nan Lo, No. 7-1, La. 246, Sec. 3, Chung-Shan Rd., Tan Tzu Hsiang, Taichung Hsien, Taiwan

[21] Appl. No.: 146,593

[22] Filed: May 5, 1980

[51] Int. Cl.³ .................... B29D 27/00; A63B 49/10
[52] U.S. Cl. .................... 264/46.6; 264/573; 264/257; 273/73 F; 273/73 J
[58] Field of Search .............. 264/45.3, 46.6, 573, 264/46.7, 46.9, 257; 273/73 F, 73 J

[56] References Cited

U.S. PATENT DOCUMENTS

| | | | |
|---|---|---|---|
| 4,070,020 | 1/1978 | Dano | 264/45.3 X |
| 4,070,021 | 1/1978 | Cecka et al. | 264/45.3 X |
| 4,124,670 | 11/1978 | Cecka et al. | 264/45.3 |
| 4,128,963 | 12/1978 | Dano | 264/45.3 X |
| 4,129,634 | 12/1978 | Cecka et al. | 264/45.3 |

*Primary Examiner*—Philip Anderson

[57] ABSTRACT

This invention discloses an improved method of producing fiber glass or fiber graphite reinforced racket frames in which a shell made of a plurality of layers of resin-impregnated oriented graphite fibers is squeezed during the heating period to contact completely with the inner surface of a mold cavity by means of two interior pressure separately generated by compressed air and a foamable elastomer or rubber composition wrapped within the shell.

2 Claims, 4 Drawing Figures

METHOD OF PRODUCING REINFORCED COMPOSITE RACKET FRAME

BACKGROUND OF THE INVENTION

This invention relates to an improved method of producing fiber glass or fiber graphite reinforced racket frames in which a shell made of a plurality of layers of resin-impregnated oriented graphite fibers is squeezed during the heating period to contact completely with the inner surface of a mold cavity by means of two interior pressure separately generated by compressed air and a foamable elastomer or rubber composition wrapped within the shell.

Recently, many methods of producing composite laminated fiber reinforced racket frames have been developed. To produce such known racket frames, a sheet of oriented fiber impregnated with the thermosetting resin is generally rolled to form a shell of the racket frame and put into a mold cavity, and then, by means of an interior expansion pressure the shell is squeezed to contact with the cavity while being heated in the mold cavity. There are two conventional methods which have been adapted to generate the interior expansion pressure. One is called direct method namely compressed air type, and the other is called indirect method namely foamable core type.

FIGS. 1 and 2 are used to illustrate the known direct method in which a shell 2 of the racket frame comprising crown, head, throat, shaft and grip portions of the racket is placed within a half mold cavity and wraps a corresponding cellophane tube 3 therein. A sealed end 30 of the cellophane tube 3 is sealed in the grip portion 25 of the racket, and the other end 31 of the cellophane tube openly extends through the frame and protrudes out of the mold 1. When the mold is heated to gel and cure the shell, a desirable amount of compressed air will be sent into the cellophane tube 3 from the open end thereof by an air compressor so as to supply a radial interior pressure which makes the shell 2 expand to contact with the surface of the mold cavity so that a desired racket frame can be obtained after completion of the curing process. Racket frames produced by this known method have a hollow portion within the shell resulting that the whole frame has a tendency to vibrate when used to hit a ball. Some lightweight foamable thermoplastic materials, such as polyvinylchloride polyethylene and polypropylene, are injected into the hollow portion of the racket frame to overcome the above-described drawback, but a second procedure of injection required to produce a racket frame will inevitably increase the production cost. Furthermore, since most outstanding vibration absorbing materials such as elastomer or rubber are very difficult to inject into the cured shell, the materials injected into the hollow portion of the shell are generally limited to thermoplastic materials.

FIG. 3 is used to illustrate the indirect method namely foamable core type which has been disclosed in the U.S. Pat. No. 4,070,021 to Andrew W. Cecka et al, and U.S. Pat. No. 4,070,020 to Pol Dano respectively, in which a racket frame is prepared by arranging within a mold cavity an outer shell made of a plurality of layers of unidirectionally oriented graphite fibers and a core comprising a seamless sleeve having a foamable resin composition therein, sealing the mold and activating the foamable resin composition to generate pressure within the mold cavity and thereby provide intimate bonding of the core to the shell. This method reduces substantially the manufacturing steps, however, it requires accurate control of the resin composition so as to generate a sufficient interior pressure before completion of the curing precess. Unfortunately, in the general practice, there are many factors, such as curing temperature, kind and amount of the foaming agent, kind and amount of the cross-linking agent, kind of the resin composition, etc., which influence the value of the interior squeeze pressure. Thus, it is relatively difficult to produce a desired product if these factors are not accurately controlled.

Accordingly, a primary object of the present invention is to provide an improved method to overcome the above-described disadvantages in which there are two interior squeeze pressure successively supplied by compressed air and a rubber composition placed within a shell respectively.

Another object of the present invention is to provide an economical method of producing racket frames which have an outstanding vibration absorption property and a fine outer surface.

A further object of the present invention is to provide a method of producing a reinforced composite racket frame which comprises a core formed by rubber or elastomer composition and is bonded intimately with the inner surface of the shell so as to avoid any accident caused by fractions of the racket frame when broken since the foamed rubber or elastomer is still flexible.

Still another object of the present invention is to provide a method of producing fiber reinforced racket frames in which the foamable rubber or elastomer composition is also cured into thermosetting so that it prevents the foamed core from softening during the racket frames being re-heated in coating process. The softened plastic will be squeezed out from the string hole by the reactivated residual foaming agent in the plastic and this will cause much elaborate work in finishing.

These and other objects and advantages of the invention will become apparent from the following description of a preferred embodiment with reference to the accompanying drawings.

DETAILED DESCRIPTION OF THE INVENTION

Figure 1:
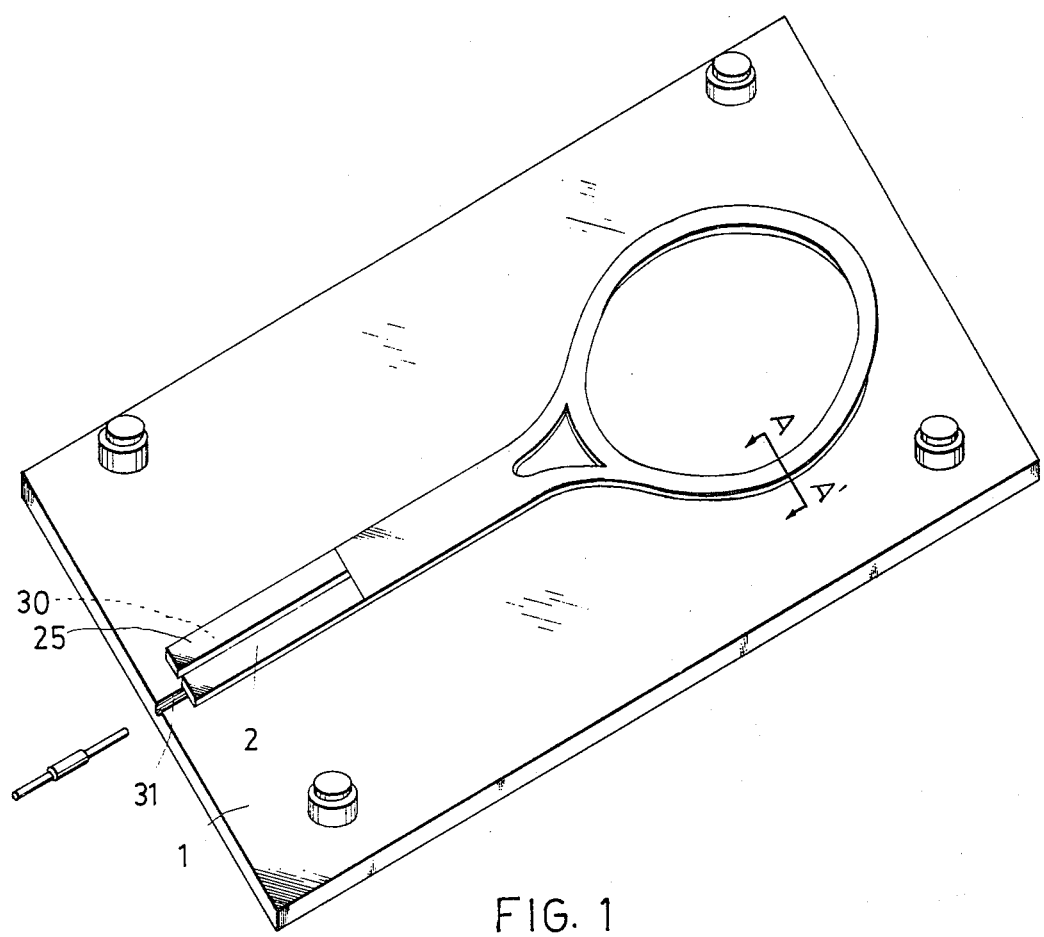
FIG. 1 is a schematic view of a half mold with a racket frame for illustrating the producing process of fiber reinforced racket frame.
Figure 2:
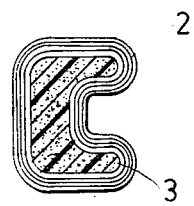
FIG. 2 is a sectional view taken substantially along the lines A—A' of FIG. 1 for illustrating the construction of a racket frame made by the known direct method.
Figure 3:
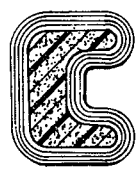
FIG. 3 is a sectional view taken substantially along the lines A—A' of FIG. 1 for illustrating the construction of the other racket frame made by the known indirect method.
Figure 4:
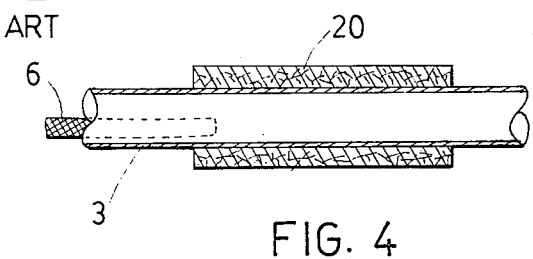
FIG. 4 is a partial longitudinal sectional view of a racket frame in accordance with the present invention before the mold thereof is heated.

According to this invention, there is provided an improved method of producing graphite fiber reinforced racket frames wherein a strip of foamable elastomer or rubber composition 6 is inserted into a cellophane tube 3 and then wrapped by prepregs 20 which are made of thermosetting resin-impregnated graphite fibers so as to form a longitudinal article whose sectional view is shown in FIG. 4. Then, the longitudinal article is arranged within a mold cavity and one open end thereof is kept protruding out of the mold. During the initial period, the mold is heated and a desirable amount of compressed air is sent into the cellophane tube 3 from its open end by an air compressor so as to supply a first interior pressure causing the longitudinal article to expand to contact intimately with the inner surface of the mold. When the heating temperature is high enough to activate the foamable elastomer or rubber, the supply of the compressed air is stopped and a second interior pressure is generated by the expansion of the foamable elastomer or rubber composition. Therefore, by means of the two successive interior pressure steps the longitudinal article can be formed into the shape of the mold cavity.

Referring to FIG. 4, it is clearly shown that the foamable elastomer or rubber composition is in a solid state and does not occupy the whole space within the cellophane tube so that the compressed air can be easily sent into to have the longitudinal article expand uniformly to get a desired configuration.

A preferred example of the foamable elastomer or rubber composition, according to the present invention, is disclosed in the following table:

| Component | % by weight |
| --- | --- |
| Rubber | |
| styrene butadiene rubber | 84.9 |
| Blowing agent | |
| di-nitrosopentamethylene tetramine | 1.3 |
| Cross-linking agent | |
| dicumylperoxide | 1.0 |
| Filler | |
| zincoxide | 6.0 |
| Filler | |
| carbon black | 6.8 |
| | 100.00 |

What is claimed is:

1. A method of producing reinforced composite racket frames composed of an outer shell made of a thermosetting material and a foam core comprising the steps of:
    (a) inserting a foamable material in a shell of thermosetting material, the outer dimension of the foamable material being less than the inner dimension of the shell so as to create a space between said shell and said foamable material;
    (b) inserting the shell and the foamable into a mold;
    (c) initially pressurizing the space with pressurized gas to force the shell to intimately contact the inner surface of the mold; and
    (d) after the initial pressurizing step, heating the mold to a temperature at which the foamable material expands to subsequently fill said space and to pressurize said space by said foamable material.

2. The method according to claim 1, wherein said foamable material is a foamable elastomer or rubber composition.

* * * * *